US012506740B2

(12) United States Patent
Monroe, II et al.

(10) Patent No.: US 12,506,740 B2
(45) Date of Patent: Dec. 23, 2025

(54) CONTEXTUAL MESSAGE FORWARDING IN A GROUP-BASED COMMUNICATION SYSTEM

(71) Applicant: Salesforce, Inc., San Francisco, CA (US)

(72) Inventors: Bradford Parker Monroe, II, Washington, DC (US); John Rodgers, Vancouver (CA); McKenna Lowry, Pleasantville, NY (US); Camilo Quintas Meneses, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 405 days.

(21) Appl. No.: 18/160,576

(22) Filed: Jan. 27, 2023

(65) Prior Publication Data

US 2024/0259384 A1   Aug. 1, 2024

(51) Int. Cl.
*H04L 9/40* (2022.01)
*H04L 51/04* (2022.01)

(52) U.S. Cl.
CPC ........... *H04L 63/104* (2013.01); *H04L 51/04* (2013.01); *H04L 63/105* (2013.01)

(58) Field of Classification Search
CPC ..... H04L 63/104; H04L 51/04; H04L 63/105; H04L 12/1822; H04L 51/214
USPC ........................................................ 726/4
See application file for complete search history.

(56) References Cited

U.S. PATENT DOCUMENTS

| 8,892,446 | B2 | 11/2014 | Cheyer et al. |
| 10,698,706 | B1 | 6/2020 | Rabe et al. |
| 11,178,088 | B1 | 11/2021 | Weiss et al. |
| 11,271,878 | B2 | 3/2022 | Christian et al. |
| 11,445,029 | B2 | 9/2022 | Rodgers et al. |

(Continued)

FOREIGN PATENT DOCUMENTS

| EP | 2843602 A1 | * | 3/2015 | ........... G06Q 10/107 |
| WO | 2022240945 A1 | | 11/2022 | |

OTHER PUBLICATIONS

PCT Patent Application PCT/US2023/021928 International Search Report and Written Opinion of the International Searching Authority issued Aug. 30, 2023.

(Continued)

*Primary Examiner* — Bryan F Wright
(74) *Attorney, Agent, or Firm* — Lee & Hayes, P.C.

(57) ABSTRACT

Media, methods, and systems are provided for contextual forwarding of messages in a group-based communication system. Messages may be forwarded from an origin channel to one or more destination channels. When messages are forwarded, parameters associated with the message may be evaluated to determine if the message can be forwarded to the destination channel and, if the message can be forwarded, if any speed bumps should be enacted before forwarding the message. A restriction level for forwarding the message may be determined. If the restriction level is a first restriction level, the message may be forwarded without speed bumps. If the restriction level is a second restriction level, a speed bump may be enacted before forwarding the message. If the restriction level is a third restriction level, the message may not be forwarded.

20 Claims, 12 Drawing Sheets

(56) References Cited

U.S. PATENT DOCUMENTS

| | | | |
|---|---|---|---|
| 11,470,163 | B2 | 10/2022 | Rodgers et al. |
| 11,481,236 | B1 | 10/2022 | Weiss et al. |
| 11,561,673 | B1 | 1/2023 | Lowry et al. |
| 2011/0053550 | A1* | 3/2011 | Xing ................ H04M 1/72418 455/404.1 |
| 2013/0154958 | A1 | 6/2013 | Clavin et al. |
| 2015/0019658 | A1* | 1/2015 | Barrera .................. H04L 51/56 709/206 |
| 2015/0264023 | A1 | 9/2015 | Reno |
| 2018/0287982 | A1 | 10/2018 | Draeger et al. |
| 2020/0177722 | A1* | 6/2020 | Janugani .......... H04N 21/41265 |
| 2020/0410583 | A1 | 12/2020 | Hart et al. |
| 2021/0118325 | A1 | 4/2021 | Gupta et al. |
| 2021/0149688 | A1 | 5/2021 | Newell et al. |
| 2021/0182087 | A1 | 6/2021 | Park et al. |
| 2021/0365806 | A1 | 11/2021 | Sumanth et al. |
| 2022/0109650 | A1 | 4/2022 | Weiss et al. |
| 2022/0109707 | A1 | 4/2022 | Butterfield et al. |
| 2022/0147197 | A1 | 5/2022 | Tross et al. |
| 2022/0158957 | A1 | 5/2022 | Christian et al. |
| 2022/0368660 | A1 | 11/2022 | Niess et al. |
| 2023/0018239 | A1 | 1/2023 | Weiss et al. |

OTHER PUBLICATIONS

U.S. Appl. No. 18/071,350, Non-Final Office Action dated Jul. 18, 2023.
David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (Nov. 2018) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000), pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 5 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

CONTEXTUAL MESSAGE FORWARDING IN A GROUP-BASED COMMUNICATION SYSTEM

TECHNICAL FIELD

Aspects of the present disclosure generally relate to data sharing in a group-based communication system. More specifically, aspects of the present disclosure relate to contextual message forwarding in a group-based communication system.

BACKGROUND

In a group-based communication system, users are generally divided into various groups or channels for communicating with other channel members. Additionally, group-based communication systems often allow users to message directly with one or more other users (e.g., a direct or multiple person direct message) separately from the channels. Channels and direct messages typically have associated privacy controls to control which users have access to which conversations. Sharing data between channels and direct messages, therefore, needs to account for the privacy controls in the various channels. Often, to share a message from one group to another, a user screenshots the message and sends the screenshot as a new message, or copies and pastes the message contents into a new message. Both these methods are generally cumbersome for the user and leads to a loss of context of the original message. Further, when content is shared in such a manner, it is often difficult to prevent data exfiltration from occurring. Improvements to sharing messages and other data in group-based communication systems are needed.

BRIEF DESCRIPTION OF THE FIGURES

Aspects of the present disclosure are described in detail below with reference to the attached drawing figures, wherein.

Figure 1:
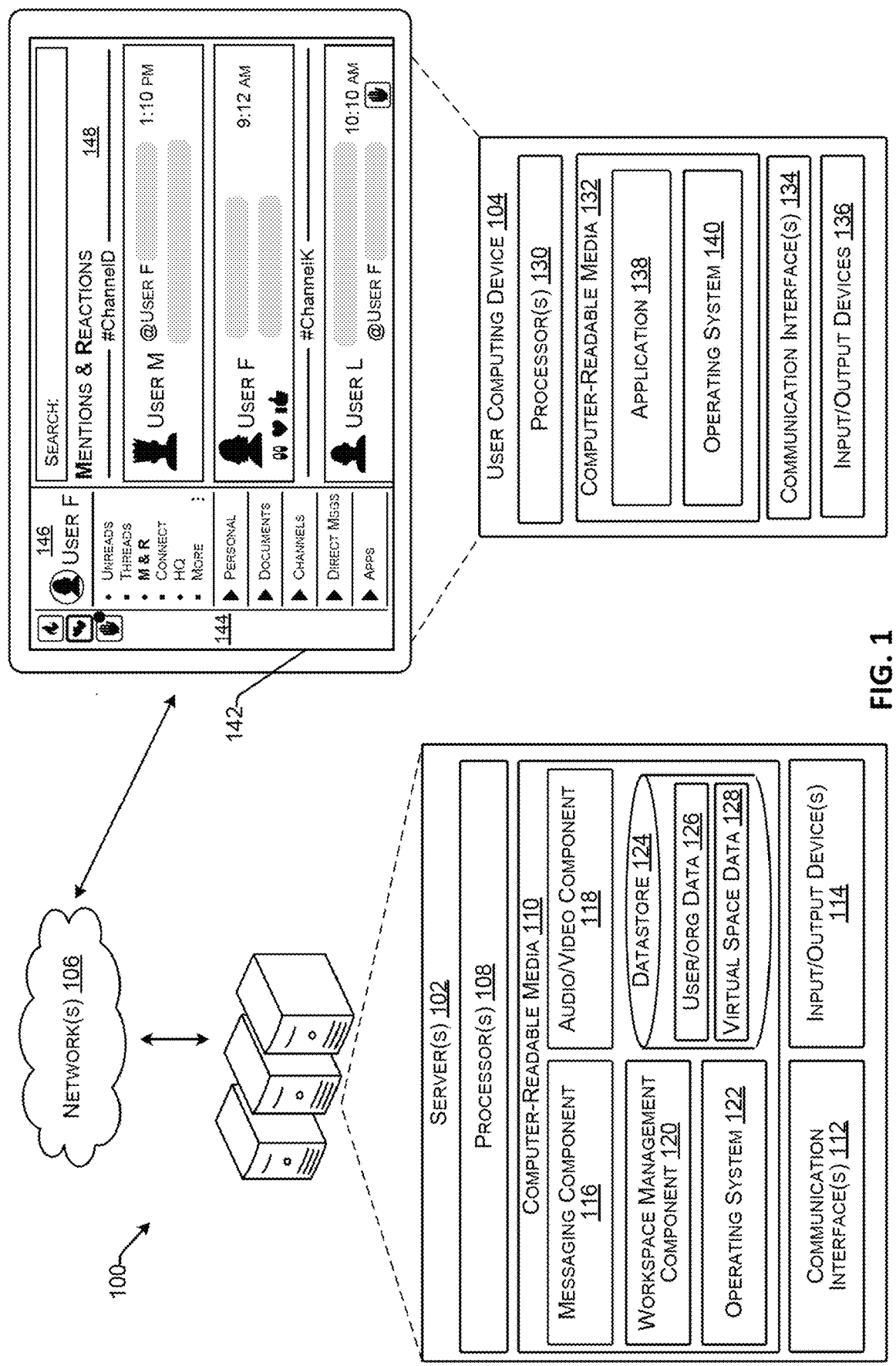
FIG. 1 illustrates an exemplary environment for certain aspects.

The drawing figures do not limit the present disclosure to the specific aspects disclosed and described herein. The drawings are not necessarily to scale, emphasis instead being placed upon clearly illustrating the principles of the present disclosure.

DETAILED DESCRIPTION

Aspects of the present disclosure provide a technical solution to one or more of the technical problems described above by providing systems and methods that, among other technical benefits, improve message sharing efficacy and group-based communication system security. For example, as discussed herein, the forwarding controls may improve security by reducing the likelihood of data exfiltration. Additionally, aspects discussed herein improve message sharing by including more context than in previous systems. Other technical benefits will be readily apparent to one of skill in the art upon reading this disclosure.

In some aspects, the techniques described herein relate to one or more non-transitory computer-readable media storing computer-executable instructions configurable to cause at least one processor to perform a method for contextual message forwarding in a group-based communication system, the method including: receiving, from an authoring user, a message in a first channel of the group-based communication system; causing display of the message in the first channel; receiving, from a second user distinct from the authoring user, an instruction to forward the message from the first channel to a second channel of the group-based communication system; responsive to receiving the instruction, determining a restriction level for the message based on a message parameter associated with the message; responsive to determining that the restriction level is a first restriction level, presenting, to the second user, a confirmation prompt for forwarding the message; receiving, via the confirmation prompt, an input from the second user; responsive to receiving the input from the second user, forwarding the message to the second channel; and causing display of the message in the second channel.

In some aspects, the techniques described herein relate to one or more non-transitory computer-readable media, wherein the method further includes: responsive to determining that the restriction level is a second restriction level distinct from the first restriction level, forwarding the message to the second channel.

In some aspects, the techniques described herein relate to one or more non-transitory computer readable media, wherein the method further includes: responsive to determining that the restriction level is a third restriction level distinct from the first restriction level and the second restriction level, refraining from forwarding the message to the second channel.

In some aspects, the techniques described herein relate to one or more non-transitory computer-readable media, wherein the message parameter includes a first identifier for the first channel and a second identifier for the second channel.

In some aspects, the techniques described herein relate to one or more non-transitory computer-readable media, wherein the message parameter is determined or modified by the authoring user.

In some aspects, the techniques described herein relate to one or more non-transitory computer-readable media, wherein the method further includes: after forwarding the message to the second channel, receiving an edit to the message in the first channel to obtain an edited message, wherein the edit is created by the second user; and updating the display of the message in the second channel to display the edited message.

In some aspects, the techniques described herein relate to one or more non-transitory computer-readable media, wherein causing display of the message further includes displaying a context for the message, the context including a timestamp and a descriptor for the first channel.

In some aspects, the techniques described herein relate to one or more non-transitory computer-readable media, wherein the method further includes: after causing display of the message in the second channel, generating a notification to the authoring user indicating that the message was forwarded to the second channel.

In some aspects, the techniques described herein relate to one or more non-transitory computer-readable media, wherein forwarding the message includes forwarding a link that links to the message in the first channel, and wherein the method further includes: responsive to forwarding the link to the second channel, presenting a second confirmation prompt to the forwarding user, and responsive to receiving a second input via the second confirmation prompt, displaying the message associated with the link.

In some aspects, the techniques described herein relate to a method for contextual message forwarding in a group-based communication system, the method including: receiving, from an authoring user, a message in a first channel of the group-based communication system; causing display of the message in the first channel; receiving, from a second user distinct from the authoring user, an instruction to forward the message from the first channel to a second channel of the group-based communication system; responsive to receiving the instruction, determining a restriction level for the message based on a message parameter associated with the message; responsive to determining that the restriction level is a first restriction level, presenting, to the second user, a confirmation prompt for forwarding the message; receiving, via the confirmation prompt, an input from the second user; responsive to receiving the input from the second user, forwarding the message to the second channel; and causing display of the message in the second channel.

In some aspects, the techniques described herein relate to a method, wherein the method further includes: responsive to determining that the restriction level is a second restriction level distinct from the first restriction level, forwarding the message to the second channel; and responsive to determining that the restriction level is a third restriction level distinct from the first restriction level and the second restriction level, refraining from forwarding the message to the second channel.

In some aspects, the techniques described herein relate to a method, wherein the message parameter is determined or modified by the authoring user.

In some aspects, the techniques described herein relate to a method, wherein the method further includes: after forwarding the message to the second channel, receiving an edit to the message in the first channel to obtain an edited message, wherein the edit is created by the second user; and updating the display of the message in the second channel to display the edited message.

In some aspects, the techniques described herein relate to a method, wherein causing display of the message further includes displaying a context for the message, the context including a timestamp and a descriptor for first origin channel.

In some aspects, the techniques described herein relate to a system, including: at least one processor; and one or more non-transitory computer-readable media storing computer-readable instructions configurable to cause the at least one processor to perform a method for contextual message forwarding in a group-based communication system, the method including: receiving, from an authoring user, a message in a first channel of the group-based communication system; causing display of the message in the first channel; receiving, from a second user distinct from the authoring user, an instruction to forward the message from the first channel to a second channel of the group-based communication system; responsive to receiving the instruction, determining a restriction level for the message based on a message parameter associated with the message; responsive to determining that the restriction level is a first restriction level, presenting, to the second user, a confirmation prompt for forwarding the message; receiving, via the confirmation prompt, an input from the second user; responsive to receiving the input from the second user, forwarding the message to the second channel; and causing display of the message in the second channel.

In some aspects, the techniques described herein relate to a system, wherein the method further includes: responsive to determining that the restriction level is a second restriction level distinct from the first restriction level, forwarding the message to the second channel.

In some aspects, the techniques described herein relate to a system, wherein the method further includes: responsive to determining that the restriction level is a third restriction level distinct from the first restriction level and the second restriction level, refraining from forwarding the message to the second channel.

In some aspects, the techniques described herein relate to a system, wherein the message parameter includes a first identifier for the first channel and a second identifier for the second channel, and wherein the message parameter is determined or modified by the authoring user.

In some aspects, the techniques described herein relate to a system, wherein the method further includes: after forwarding the message to the second channel, receiving an edit to the message in the first channel to obtain an edited message, wherein the edit is created by the second user; and updating the display of the message in the second channel to display the edited message.

In some aspects, the techniques described herein relate to a system, wherein causing display of the message further includes displaying a context for the message, the context including a timestamp and a descriptor for first origin channel.

The following detailed description of aspects of the present disclosure references the accompanying drawings that illustrate specific aspects in which the present disclosure can be practiced. The detailed description is intended to describe aspects of the present disclosure in sufficient detail to enable those skilled in the art to practice the present disclosure. Other aspects can be utilized, and changes can be made without departing from the scope of the present disclosure. The following detailed description is, therefore, not to be taken in a limiting sense. The scope of aspects of the present disclosure is defined only by the appended claims, along with the full scope of equivalents to which such claims are entitled.

In this description, references to "one aspect," "an aspect," or "aspects" mean that the feature or features being referred to are included in at least one aspect of the technology. Separate reference to "one aspect," "an aspect," or "aspects" in this description do not necessarily refer to the same aspect and are also not mutually exclusive unless so stated and/or except as will be readily apparent to those skilled in the art from the description. For example, a feature, structure, or act described in one aspect may also be included in other aspects but is not necessarily included. Thus, the technology can include a variety of combinations and/or integrations of the aspects described herein.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with the same organization. In some examples, members of a group, and thus workspace, can be associated with different organizations (e.g., entities with different organization identifiers).

In at least one example, the example environment 100 can include one or more server computing devices, such as server(s) 102 as shown. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single example of user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more instances of processor(s) 108, computer-readable media 110, one or more instances of communication interface 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102, such as performing the methods described below. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a first instance of user computing device 104 and can send the message as an incoming message to a second instance of user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication temporary identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective instances of user computing devices 104. In various examples, the messaging component 116 can identify the message as an update to the virtual space and, based on the identified update, can cause a notification associated with the update to be presented in association with a sidebar of the user interface associated with one or more of the users associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace.

In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. Additional details of operations that can be performed by the workspace management component 120 are described below.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user computing device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication temporary identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication temporary identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The one or more instances of communication interface 112 can include one or more interfaces and hardware components for enabling communication with various other devices (e.g., the user computing device 104), such as over the network(s) 106 or directly. In some examples, the one or more instances of communication interface 112 can facilitate communication via Websockets, Application Programming Interfaces (APIs) (e.g., using API calls), Hypertext Transfer Protocols (HTTPs), etc.

The server(s) 102 can further be equipped with various input/output devices 114 (e.g., I/O devices). Such input/output devices 114 can include a display, various user interface controls (e.g., buttons, joystick, keyboard, mouse, touch screen, etc.), audio speakers, connection ports and so forth.

In at least one example, the user computing device 104 can include one or more instances of processor(s) 130, computer-readable media 132, one or more instances of communication interface(s) 134, and input/output devices 136.

In at least one example, each processor of the processor(s) 130 can be a single processing unit or multiple processing units and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one instance of application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such input/output devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server(s) 102, the user computing device 104, or a combination thereof.

User Interface for a Group-Based Communication System

Figure 2A:
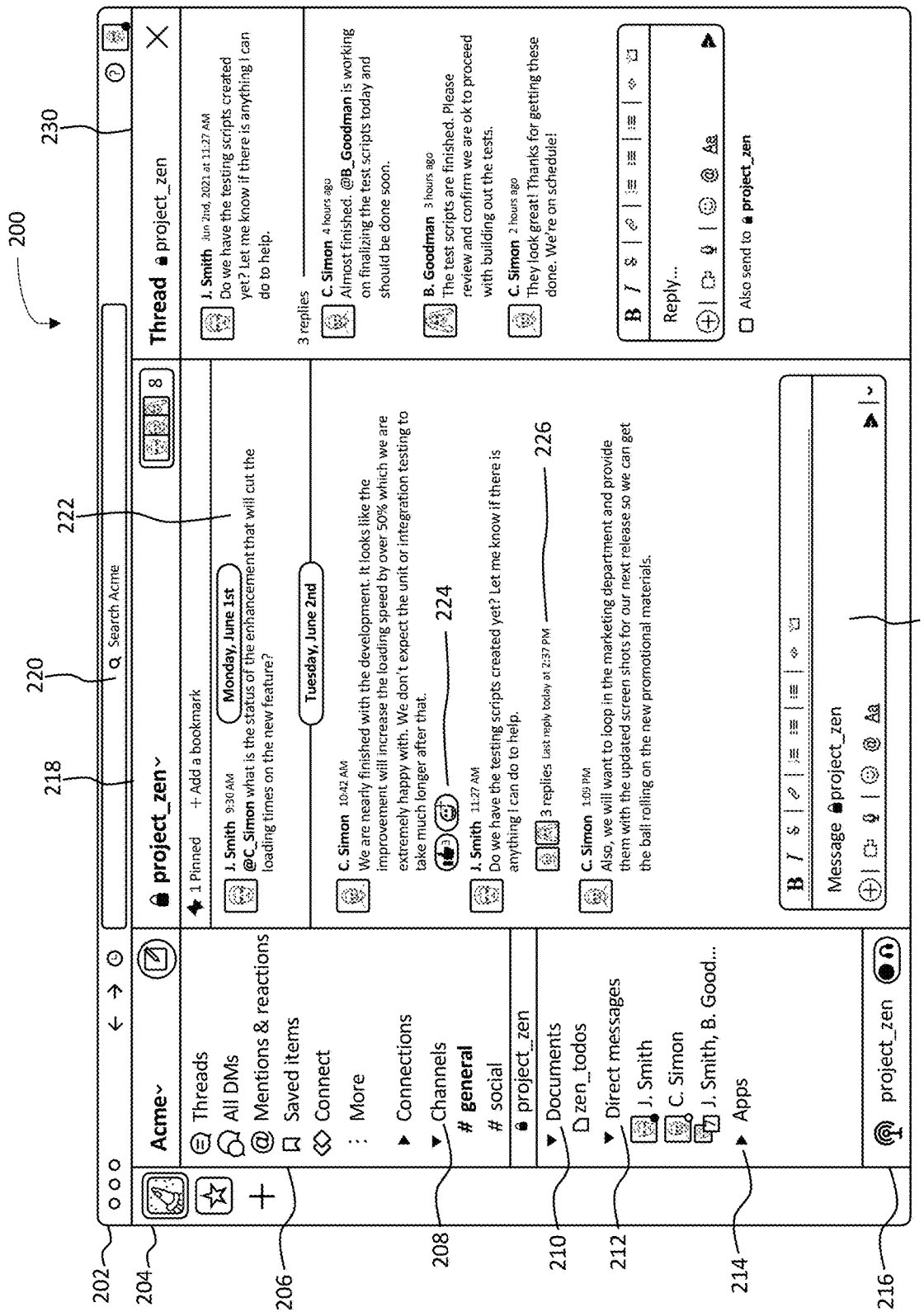
FIG. 2A illustrates a user interface for a group-based communication system for certain aspects.

FIG. 2A illustrates a user interface 200 of a group-based communication system, which will be useful in illustrating the operation of various aspects, as discussed in further detail below. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

User interface 200 comprises a plurality of objects such as panes, text entry fields, buttons, messages, or other user interface components that are viewable by a user of the group-based communication system. As depicted, user interface 200 comprises title bar 202, workspace pane 204, navigation pane 206, synchronous multimedia collaboration session pane 216, channel pane 218, and thread pane 230.

In some aspects, title bar 202 comprises search bar 220. Search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some aspects, title bar 202 comprises navigation commands allowing a user to move backwards and forwards between different panes, as well as to view a history of accessed content. Title bar 202 may comprise additional resources such as links to help documents and user configuration settings.

In some aspects, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some aspects, user interface 200 comprises workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some aspects, an organization, such as a particular company, may have a plurality of workspaces, and the user may be associated with one or more workspaces belonging to the organization. In yet other aspects, a particular workspace can be associated with one or more organizations or other entities associated with the group-based communication system.

In some aspects, navigation pane 206 permits users to navigate between virtual spaces such as pages, channels 208, collaborative documents 210 (such as those discussed at FIG. 2D), applications 214, and direct messages 212 within the group-based communication system. For example, navigation pane 206 can include indicators representing virtual spaces that can aggregate data associated with a plurality of virtual spaces of which the user is a member. In at least one example, each virtual space can be associated with an indicator in navigation pane 206. In some examples, an indicator can be associated with an actuation mechanism (e.g., affordance) such that when actuated, can cause user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

Navigation pane 206 may further comprise indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces or, alternatively, may only be associated with one of the workspaces. In some examples, the communication channels represented can be associated with combinations of communication channels associated with a single workspace and communication channels associated with different workspaces.

In some aspects, navigation pane 206 may depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, navigation pane 206 can depict all communication channels, or a subset of all communication channels, that the user is a member of, and the user can interact with user interface 200 to browse or view other communication channels that the user is not a member of but are not currently displayed in navigation pane 206. In some examples, different types of communication channels (e.g., public, private, shared, cross-workspace, etc.) can be in different sections of navigation pane 206, or can have their own sub-regions or sub-panes in the user interface 200. In some examples, communication channels associated with different workspaces can be in different sections of navigation pane 206 or can have their own regions or panes in user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, navigation pane 206 can include indicators representative of communications with individual users or multiple specified users (e.g., instead of all, or a subset of, members of an organization). Such communications can be referred to as "direct messages." Navigation pane 206 can include indicators representative of virtual spaces that are associated with private messages between one or more users.

Direct messages 212 may be communications between a first user and a second user, or they may be multi-person direct messages between a first user and two or more second users. Navigation pane 206 may be sorted and organized into hierarchies or sections depending on the user's preferences. In some aspects, all of the channels to which a user has been granted access may appear in navigation pane 206. In other aspects, the user may choose to hide certain channels or collapse sections containing certain channels. Items in navigation pane 206 may indicate when a new message or update has been received or is currently unread, such as by bolding the text associated with a channel in which an unread message is located or adding an icon or badge (for example, with a count of unread messages) to the channel name. In some aspects, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, though not illustrated, navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels Within the Group-Based Communication System

In some aspects, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication temporary identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some aspects, channel pane 218 may display information related to a channel that a user has selected in navigation pane 206. For example, a user may select the project_zen channel to discuss the ongoing software development efforts for Project Zen. In some aspects, channel pane 218 may include a header comprising information about the channel, such as the channel name, the list of users in the channel, and other channel controls. Users may be able to pin items to the header for later access and to add bookmarks to the header. In some aspects, links to collaborative documents may be included in the header. In further aspects, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via channel pane 218 of user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

Channel pane 218 may include messages such as message 222, which is content posted by a user into the channel. Users may post text, images, videos, audio, or any other file as message 222. In some aspects, particular identifiers (in messages or otherwise) may be denoted by prefixing them with predetermined characters. For example, channels may be prefixed by the "#" character (as in #project_zen) and username may be prefixed by the "@" character (as in @austin_a). Messages such as message 222 may include an indication of which user posted the message and the time at which the message was posted. In some aspects, users may react to messages such as message 222 by selecting reaction button 224. Reaction button 224 allows users to select an icon (sometimes called a reactji in this context), such as a thumbs up, to be associated with the message. Users may respond to messages such as message 222 of another user with a new message such as message 222. In some aspects, such conversations in channels may further be broken out into threads. Threads may be used to aggregate messages related to a particular conversation together to make the conversation easier to follow and reply to, without cluttering the main channel with the discussion. Under the message beginning the thread appears thread reply preview 226. Thread reply preview 226 may show information related to the thread, such as, for example, the number of replies and the members who have replied. Thread replies may appear in thread pane 230 that may be separate from channel pane 218 and may be viewed by other members of the channel by selecting thread reply preview 226 in channel pane 218.

In some aspects, one or both of channel pane 218 and thread pane 230 may include compose pane 228. Compose pane 228 allows users to compose and transmit messages 222 to the members of the channel or to those members of the channel who are following the thread (when the message is sent in a thread). Compose pane 228 may have text editing functions such as bold, strikethrough, and italicize. Compose pane 228 may also allow users to format their messages or attach files such as collaborative documents, images, videos, or any other files to share with other members of the channel. In some aspects, compose pane 228 may enable additional formatting options such as numbered or bulleted lists via either the user interface or an API. Compose pane 228 may also function as a workflow trigger to initiate workflows related to a channel or message. In further aspects, links or documents sent via compose pane 228 may include unfurl instructions related to how the content should be displayed.

Synchronous Multimedia Collaboration Sessions

Figure 2B:
FIG. 2B illustrates a user interface for synchronous multimedia collaboration sessions within the group-based communication system for certain aspects.

FIG. 2B illustrates a synchronous multimedia collaboration session that has been triggered from a channel, as shown in synchronous multimedia collaboration session pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some aspects, synchronous multimedia collaboration sessions may be based around a particular topic, a particular channel, a particular direct message or multi-person direct message, or a set of users, while in other aspects, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some aspects, the audience of a synchronous multimedia collaboration session may be determined based on the context in which the synchronous multimedia collaboration session was initiated. For example, starting a synchronous multimedia collaboration session in a channel may automatically invite the entire channel to attend. As another example, starting a synchronous multimedia collaboration session allows the user to start an immediate audio and/or video conversation with other members of the channel without relying on scheduling or initiating a communication session through a third-party interface. In some aspects, users may be directly invited to attend a synchronous multimedia collaboration session via a message or notification.

Synchronous multimedia collaboration sessions may be short, ephemeral sessions from which no data is persisted. Alternatively, in some aspects, synchronous multimedia collaboration sessions may be recorded, transcribed, and/or summarized for later review. In other aspects, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some aspects, members of the synchronous multimedia collaboration session may mark-up, comment on, draw on, or otherwise annotate a shared screen. In further aspects, such annotations may be saved and persisted after the synchronous multimedia collaboration session has ended. A canvas may be created directly from a synchronous multimedia collaboration session to further enhance the collaboration between users.

In some aspects, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 231. In some aspects, users in the synchronous multimedia collaboration session may be displayed with an icon indicating that they are participating in the synchronous multimedia collaboration session. In further aspects, an expanded view of the participants may show which users are active in the synchronous multimedia collaboration session and which are not. Screen share preview 231 may depict the desktop view of a user sharing the user's screen, or a particular application or presentation. Changes to the user's screen, such as the user advancing to the next slide in a presentation, will automatically be depicted in screen share preview 231. In some aspects, screen share preview 231 may be actuated to cause screen share preview 231 to be enlarged such that it is displayed as its own pane within the group-based communication system. Synchronous multimedia collaboration session pane 216 may comprise tools for the synchronous multimedia collaboration session allowing a user to mute the user's microphone or invite other users. In some aspects, synchronous multimedia collaboration session pane 216 may comprise screen share button 232. Screen share button 232 may permit a user to share the user's screen with other members of the synchronous multimedia collaboration session pane 216. In some aspects, screen share button 232 may provide a user with additional controls during a screen share. For example, a user sharing the user's screen may be provided with additional screen share controls to specify which screen to share, to annotate the shared screen, or to save the shared screen. When no synchronous multimedia collaboration session is active, synchronous multimedia collaboration session pane 216 may be associated with a currently selected channel, direct message, or multi-person direct message such that a synchronous multimedia collaboration session may be initiated and associated with the currently selected channel, direct message, or multi-person direct message. Similarly, when a synchronous multimedia collaboration session is active, the synchronous multimedia collaboration session pane 216 may be associated with a channel in which the synchronous multimedia collaboration session was initiated. In some aspects, synchronous multimedia collaboration session pane 216 may instead be unassociated with any channels, multi-person direct messages, or direct messages.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some aspects, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some aspects, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some aspects, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some aspects, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some aspects, one or more recommended asynchronous multimedia collaboration sessions or meetings are displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some aspects, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some aspects, a preview of a subset of video replies may be shown in the asynchronous collaboration session or thread. This can allow, for example, a user to jump to a relevant segment of the asynchronous multimedia collaboration session or to pick up where they left off previously.

In some aspects, the group-based communication system may comprise one or more canvases (or one or more links to canvases). A canvas can include a flexible workspace for curating, organizing, and sharing collections of information between users. Such canvases may be associated with a synchronous multimedia collaboration session, an asynchronous multimedia collaboration session, a channel, a multi-person direct message conversation, or a direct message conversation. Alternatively, or in addition, a user might have one or more private canvases that are not associated with any other users. Shared canvases can be configured to be accessed and/or modified by two or more users with appropriate permissions. In some aspects, canvases can be configured to enable sharing of content including (but not limited to) text, images, videos, GIFs, drawings (e.g., user-generated drawings via a drawing interface), or gaming content. In some aspects, users accessing a canvas can add new content or delete (or modify) content previously added. In some aspects, appropriate permissions may be utilized for a user to add content or to delete or modify content added by a different user. Thus, for example, some users may only be able to access a canvas in view-only mode, while other users may be able to access the canvas in an edit mode allowing those users to add or modify its contents. In some examples, a canvas can be shared via a message in a channel, multi-person direct message, or direct message, such that data associated with the canvas is accessible to and/or rendered interactable for members of the channel or recipients of the multi-person direct message or direct message.

Connecting Within the Group-Based Communication System

Figure 2C:
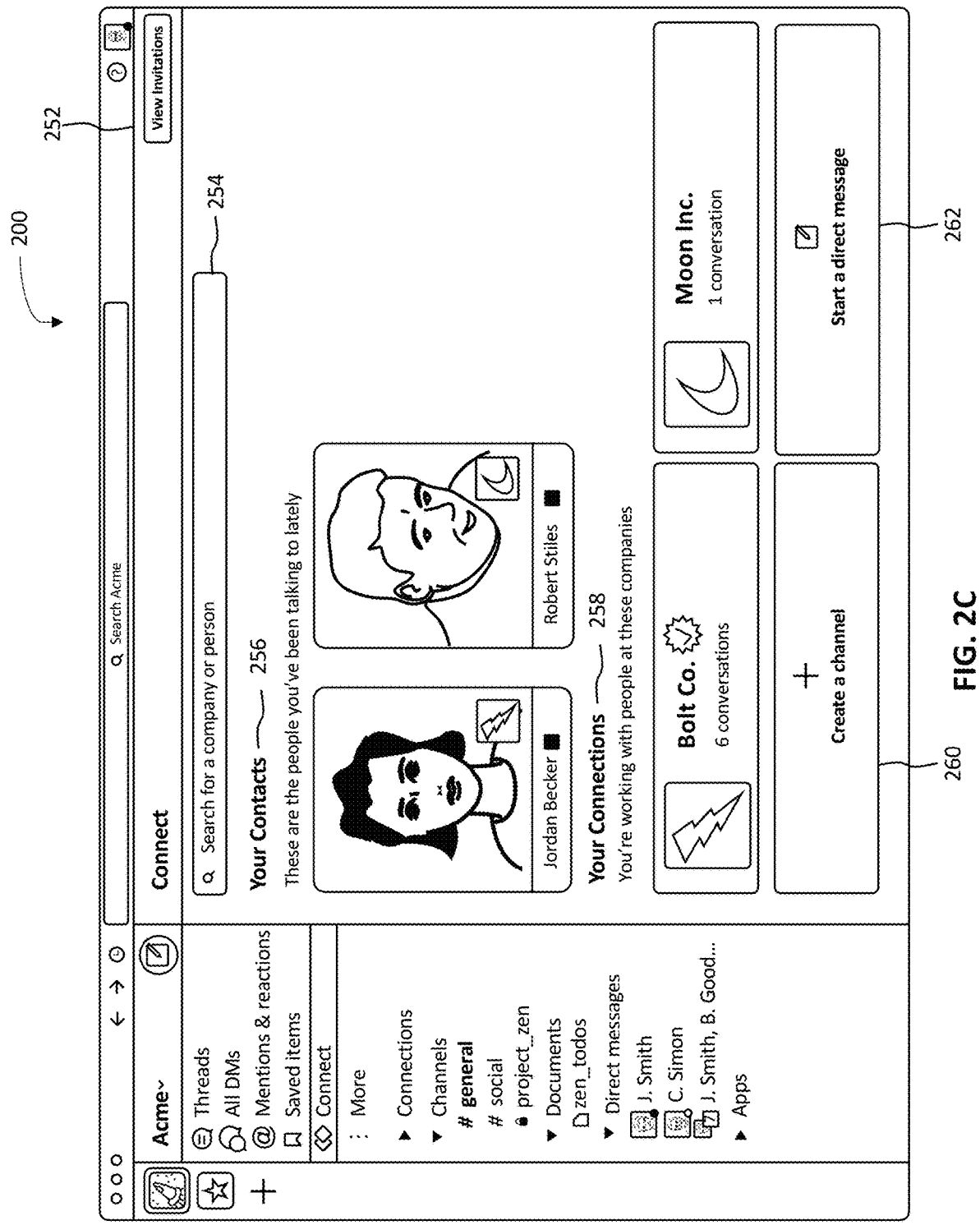
FIG. 2C illustrates a user interface for inter-organization collaboration within the group-based communication system for certain aspects.

FIG. 2C illustrates user interface 200 displaying connect pane 252. Connect pane 252 provides tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. Connect pane 252 may enable users to determine which other users and organizations are already within the group-based communication system, and to invite those users and organizations currently outside of the group-based communication system to join.

Connect pane 252 may comprise connect search bar 254, recent contacts 256, connections 258, create channel button 260, and start direct message button 262. Connect search bar 254 permits a user to search for users within the group-based communication system. In some aspects, only users from organizations that have connected with the user's organization will be shown in the search results. In other aspects, users from any organization that uses the group-based communication system can be displayed. In still other aspects, users from organizations that do not yet use the group-based communication can also be displayed, allowing the searching user to invite them to join the group-based communication system. In some aspects, users can be searched for via their group-based communication system username or their email address. In some aspects, email addresses may be suggested or autocompleted based on external sources of data such as email directories or the searching user's contact list.

In some aspects, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some aspects, recent contacts 256 may display users with whom the instant user has recently interacted. The recent contacts 256 may display the user's name, company, and a status indication. Recent contacts 256 may be ordered based on which contacts the instant user most frequently interacts with or based on the contacts with whom the instant user most recently interacted. In some aspects each recent contact of recent contacts 256 may be an actuatable control allowing the instant user to quickly start a direct message conversation with the recent contact, invite them to a channel, or take any other appropriate user action for that recent contact.

In some aspects, connections 258 may display a list of companies (e.g., organizations) with which the user has interacted. For each company, the name of the company may be displayed along with the company's logo and an indication of how many interactions the user has had with the company, for example the number of conversations. In some aspects, each connection of connections 258 may be an actuatable control allowing the instant user to quickly invite the external organization to a shared channel, display recent connections with that external organization, or take any other appropriate organization action for that connection.

In some aspects, create channel button 260 allows a user to create a new shared channel between two different organizations. Selecting create channel button 260 may further allow a user to name the new connect channel and enter a description for the connect channel. In some aspects, the user may select one or more external organizations or one or more external users to add to the shared channel. In other aspects, the user may add external organizations or external users to the shared channel after the shared channel is created. In some aspects, the user may elect whether to make the connect channel private (i.e., accessible only by invitation from a current member of the private channel).

In some aspects, start direct message button 262 allows a user to quickly start a direct message (or multi-person direct message) with external users at an external organization. In some aspects, the external user identifier at an external organization may be supplied by the instant user as the external user's group-based communication system username or as the external user's email address. In some aspects, an analysis of the email domain of the external user's email address may affect the message between the user and the external user. For example, the external user's identifier may indicate (for example, based on an email address domain) that the user's organization and the external user's organization are already connected. In some such aspects, the email address may be converted to a group-based communication system username. Alternatively, the external user's identifier may indicate that the external user's organization belongs to the group-based communication system but is not connected to the instant user's organization. In some such aspects, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
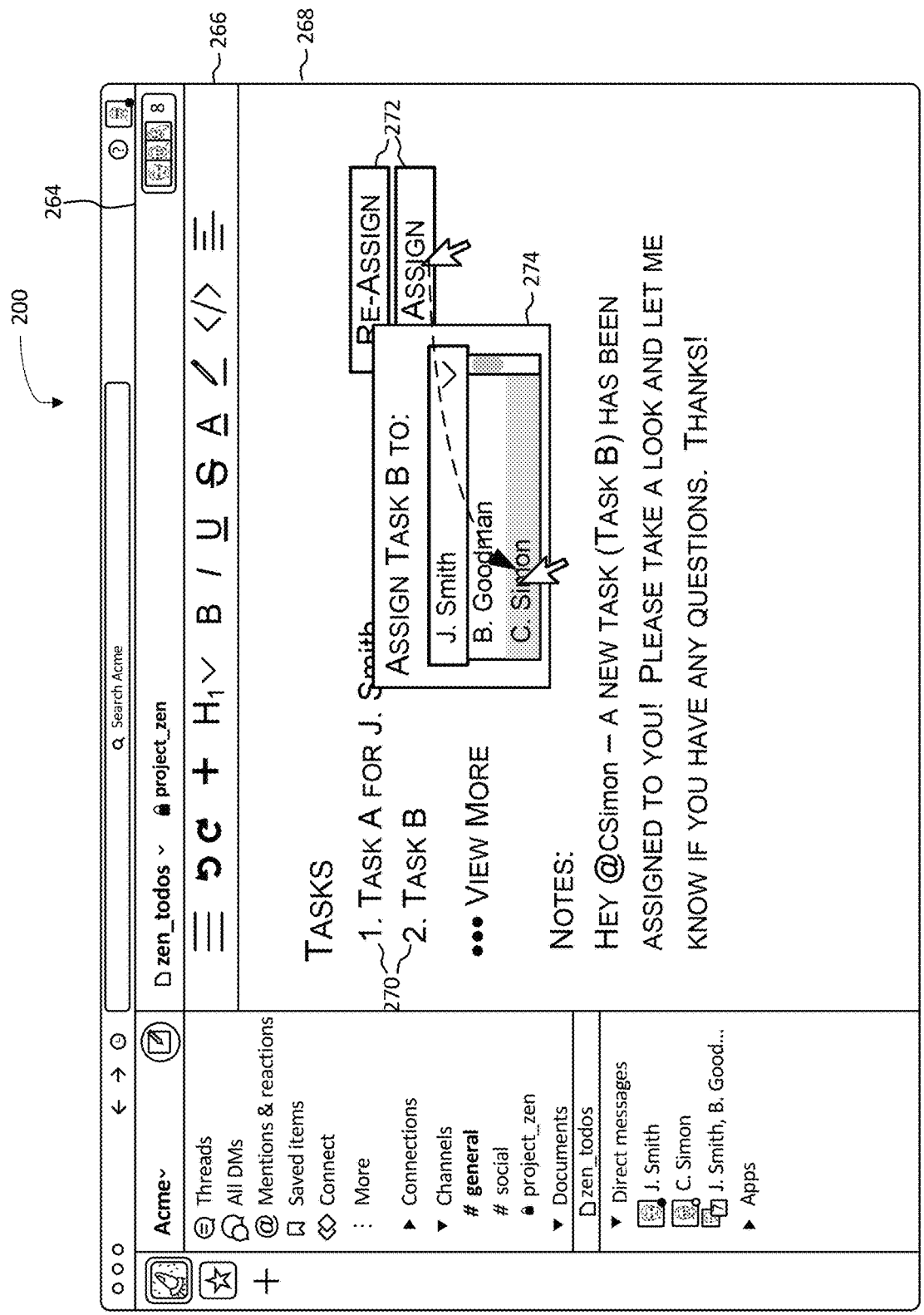
FIG. 2D illustrates a user interface for collaborative documents within the group-based communication system for certain aspects.

FIG. 2D illustrates user interface 200 displaying collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Collaborative documents may allow users to create and modify documents simultaneously or asynchronously. Collaborative documents may integrate with the group-based communication system and can both initiate workflows and be used to store the results of workflows. Collaboration document pane 264 may comprise collaborative document toolbar 266 and collaborative document 268. In some aspects, collaborative document toolbar 266 may provide the ability to bold, italicize, underline, or otherwise format text, the ability to undo or redo actions, the ability to insert and format pictures and shapes, or any other word processing functionality to modify the content within collaborative document 268.

In some aspects, collaborative documents may comprise free-form unstructured sections and workflow-related structured sections. In some aspects, unstructured sections may include areas of the document in which a user can freely modify the collaborative document without any constraints. For example, a user may be able to freely type text to explain the purpose of the document. In some aspects, a user may add a workflow or a structured workflow section by typing the name of (or otherwise mentioning) the workflow. In further aspects, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some aspects, structured sections may include text entry, selection menus, tables, checkboxes, tasks, calendar events, or any other document section. In further aspects, structured sections may include text entry spaces that are a part of a workflow. For example, a user may enter text into a text entry space detailing a reason for approval, and then select a submit button that will advance the workflow to the next step of the workflow. In some aspects, the user may be able to add, edit, or remove structured sections of the document that make up the workflow components.

In aspects, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further aspects, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In aspects, the first user can select the plurality of collaborative documents and the "Group Information" section to effectuate permissions to access (or view, edit, etc.) to the entire user group the "Group Information" section of each of the plurality of collaborative documents. In some aspects, the collaborative document comprises one or more tasks 270 along with one or more assignment options 272 corresponding to the one or more tasks 270, as shown. In some aspects, an assignment dropdown menu 274 may be displayed in response to a user selecting one of the one or more assignment options 272.

Contextual Message Forwarding

As discussed hereinafter, aspects of the present disclosure provide for forwarding of messages from a first virtual space to a second virtual space and determining restrictions to place (if any) on forwarding messages based on various contextual information. In some aspects, the channel that a message is forwarded from is referred to as an origin channel, and the channel that the message is forwarded to is referred to as the destination channel. As used herein, a channel includes any communication channel within the group-based communication system, including direct messages and multiple person direct messages (MPDM). In some aspects, when a forwarding user forwards a message, contextual information associated with the message is evaluated to determine a restriction level for the message. In some aspects, the contextual information comprises the destination channel, the identities of the authoring user and the forwarding user, member commonality between the origin channel and the destination channel, or any combination thereof. In some aspects, the contextual information comprises defined controls controlling forwarding of the message, which may be defined on a per-message, per-user, per-channel, per-workspace basis, or any combination thereof. Based on the restriction level, either (1) the message may be forwarded to the destination channel, (2) a speed bump (also referred to as a preventative measure) may be enacted before the message can be forwarded, or (3) the group-based communication system may refrain from forwarding the message.

In some aspects, messages may be forwarded as static objects such that any changes made to the original message after the original message has been forwarded are not reflected in the forwarded message. In some aspects, messages may be forwarded as live objects such that changes (e.g., edits to the message contents, thread replies, reactjis, etc.) are reflected wherever the message has been forwarded. In some aspects, messages can be forwarded as unfurls. In some aspects, messages can be forwarded by transmitting a link to the message, which may be selected to view the message in the origin channel.

Figure 3A:
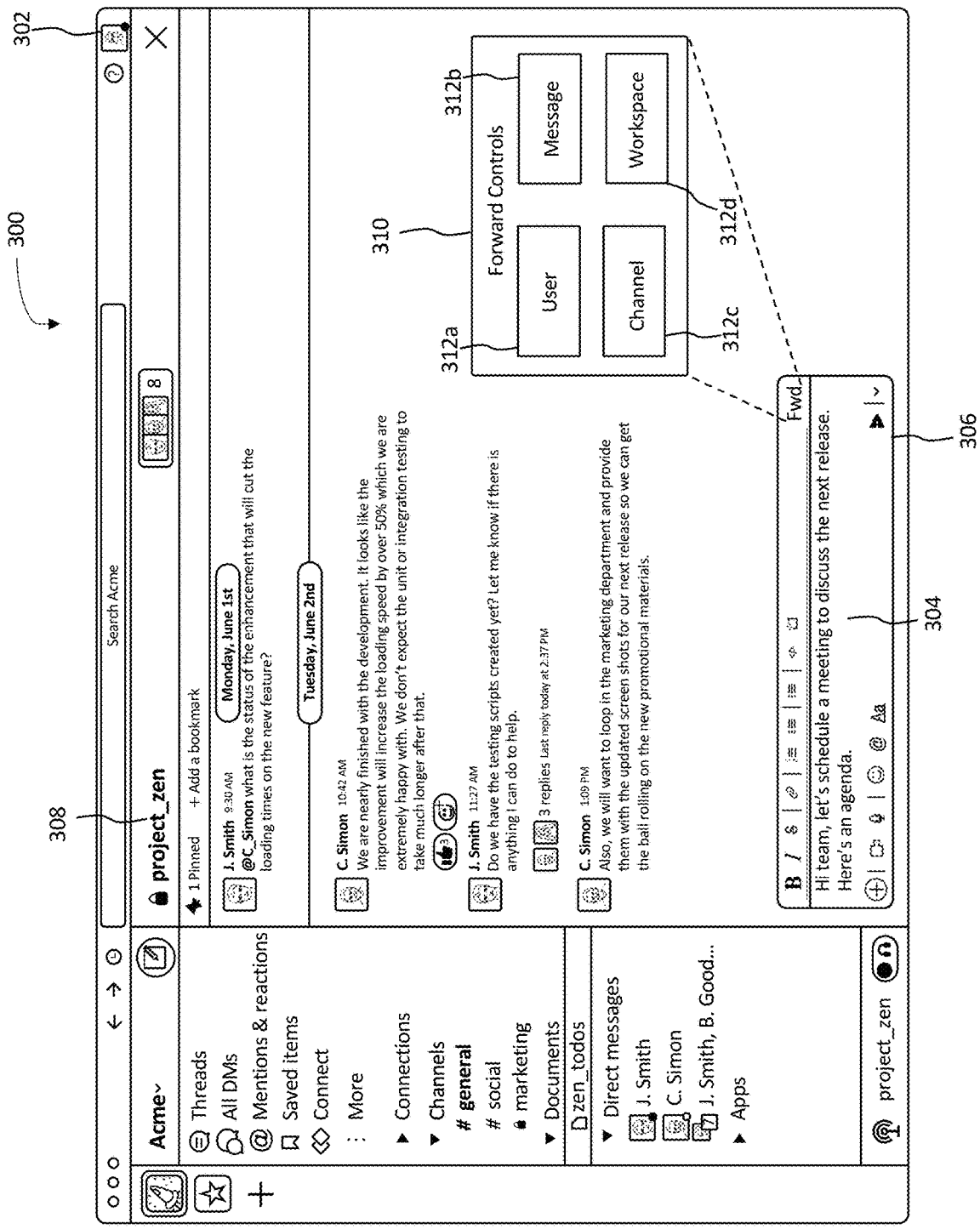
FIG. 3A illustrates a user interface for the group-based communication system for certain aspects.

FIGS. 3A-3E illustrates a user interface 300 in accordance with aspects of the present disclosure. Where common features or elements are unchanged with respect to their description in FIGS. 2A-2D, they are not discussed further herein. FIG. 3A depicts an exemplary scenario in which an authoring user 302 (A. Author) is composing a message 304 via a compose pane 306 to post in an origin channel 308 (project_zen) of the group-based communication system. Compose pane 306 may be substantially similar to compose pane 228 discussed above. In some aspects, compose pane 306 comprises a forward message control that can be selected to cause display of a forward controls pane 310. Forward controls pane 310 may present various options for allowing the authoring user 302 to define, modify, and/or view one or more message controls defining how the message 304 can be forwarded within the group-based communication system. As discussed further below, in some aspects, the message controls may be used to determine a restriction level for the message 304.

In some aspects, the message controls include user-level control(s) 312a, message-level control(s) 312b, channel-level control(s) 312c, and workspace-level control(s) 312d. In some aspects, user-level control(s) 312a define how each message authored by the authoring user 302 can be forwarded within the group-based communication system. For example, the authoring user 302 may define that all authored messages require their approval prior to being forwarded. It is contemplated that the authoring user 302 may define user-level control(s) 312a on a per channel basis, per channel type (e.g., public, private, shared, DM, etc.) and/or per workspace basis. For example, the authoring user 302 may indicate that all messages sent in a public channel can be forwarded to any other channel, while all messages sent in a private channel cannot be forwarded to other channels. As another example, the authoring user 302 may indicate that messages authored in a private channel can only be forwarded to other channels in which each member of the destination channel is also a member of the private channel. Further, the authoring user 302 may define an exception to the private channel restriction, allowing messages authored in a specified private channel to be forwarded to any channel (or a list of defined channels) in the group-based communication system. Various other controls that may be set on message forwarding will be readily apparent to one of skill in the art.

In some aspects, message-level control(s) 312b define how a specific instance of message 304 may be forwarded within the group-based communication system. The message-level control(s) 312b may be defined by the authoring user 302 of the message 304. For example, the authoring user 302 may define whether the message 304 can or cannot be forwarded and/or to which channels (if any) the message 304 can be forwarded. In some aspects, message-level control(s) 312b overrides user-level control(s) 312a set by the authoring user 302. In some aspects, the user-level control(s) 312a and message-level control(s) 312b defined by authoring user 302 only apply to forwarding of message 304 by other users. That is, authoring user 302 may forward any message 304 that they authored regardless of any user-level control(s) 312a or message-level control(s) 312b set on the message 304.

Message-level control(s) 312b may also be defined to control how certain message contents may be forwarded. For example, if the authoring user 302 sends a message 304 that includes an attached file, authoring user 302 may define message-level control(s) 312b indicating that the text content of the message can be forwarded, while the attached file cannot be forwarded, is forwarded with restricted access, or the like. In some aspects, separate controls may be defined for forwarding files (or other non-textual data) attached to instances of message 304. For example, authoring user 302 may define user-level control(s) 312a allowing all instances of message 304 to be forwarded but requiring approval to forward files that are attached to messages. In some aspects, when a file is forwarded, access to the file is granted to recipients of the forwarded message. In some aspects, as discussed further below with respect to FIG. 3B, the forwarding user has control over how files attached to instances of message 304 are forwarded.

In some aspects, channel-level control(s) 312c define forwarding controls for a channel such that each message sent in the channel adheres to the channel-level control(s) 312c. Likewise, workspace-level control(s) 312d may define forwarding controls for an entire workspace such that each message sent in the workspace adheres to the workspace-level control(s) 312d. Thus, in some aspects, channel-level control(s) 312c, and/or workspace-level control(s) 312d are immutable by the authoring user 302. In some aspects, channel-level control(s) 312c and/or workspace-level control(s) 312d may be defined by an admin user of the channel or workspace. Like the user-level control(s) 312a and message-level control(s) 312b described above, channel-level control(s) 312c and/or workspace-level control(s) 312d may be defined to control if messages can be forwarded, where messages can be forwarded, if specific message content can be forwarded, or any combination thereof. Workspace-level control(s) 312d may also control how messages can be forwarded within shared channels. For example, workspace-level control(s) 312d may be set to prevent message forwarding of messages to shared channels having members that are external to the workspace. In some aspects, channel-level control(s) 312c and workspace-level control(s) 312d override any user-level control(s) 312a or message-level control(s) 312b set by authoring user 302.

As discussed above, the restriction level for a message 304 may be determined based on the defined instances of user-level control(s) 312a, message-level control(s) 312b, channel-level control(s) 312c, and/or workspace-level control(s) 312d. If no controls are set for sending message 304 to the destination channel, the message 304 may be assigned the first restriction level, and the message 304 may be forwarded without any preventative measures. If one or more controls are set to enact a speed bump upon forwarding of the message 304 to the destination channel, the message 304 may be assigned the second restriction level. For example, the speed bump may take the form of a confirmation prompt requiring the forwarding user to confirm that they wish to forward the message 304. If a control is set that prevents forwarding the message 304, the message 304 may be assigned the third restriction level, and the message 304 may be prevented from being forwarded.

In some aspects, forwarding of instances of message 304 and whether to enact a speed bump may be determined based on contextual information. In some aspects, to determine whether to forward a message, to present a speed bump, or to refrain from forwarding a message, the destination channel, the authoring user 302, the members of the origin channel 308 and the destination channel, or any combination thereof are analyzed. In some aspects, forwarding restrictions are determined based on a type of channel of the destination channel. For example, the restriction level for forwarding a message to a direct message may be lower than the restriction level for forwarding the message to a public channel. As another example, the number of channel members may determine whether speed bumps are enacted. In some aspects, if the number of channel members is above a threshold number (e.g., 10, 50, or 100 members), a speed bump is enacted. Enacting speed bumps based on a threshold number of recipients of a forwarded measure may be useful as the risk of data exfiltration will likely increase with the number of recipients. In some aspects, if the direct message involves at least one external member, the risk level may be deemed to be higher, and more restrictions may be enacted.

Along with channel type (or independent of channel type), the identity of the authoring user 302 and the forwarding user 316 may affect the restrictions placed on the message 304. In many cases, if the forwarding user 316 is the authoring user 302, the risk level for sharing the message 304 may be considered low, and the message 304 may be lightly restricted or not restricted at all. In some cases, restrictions may still be placed on forwarding a message 304 when the forwarding user 316 is the authoring user 302. For example, if the authoring user 302 is attempting to forward a message from a first channel to a second channel that has external members, restrictions may be placed on message 304. Thus, inadvertent sharing of message 304 with members outside of the user's organization may be mitigated. Handling of message forwarding based on channel type, the forwarding and authoring users, and common channel membership is discussed further below with respect to FIG. 5.

Figure 3B:
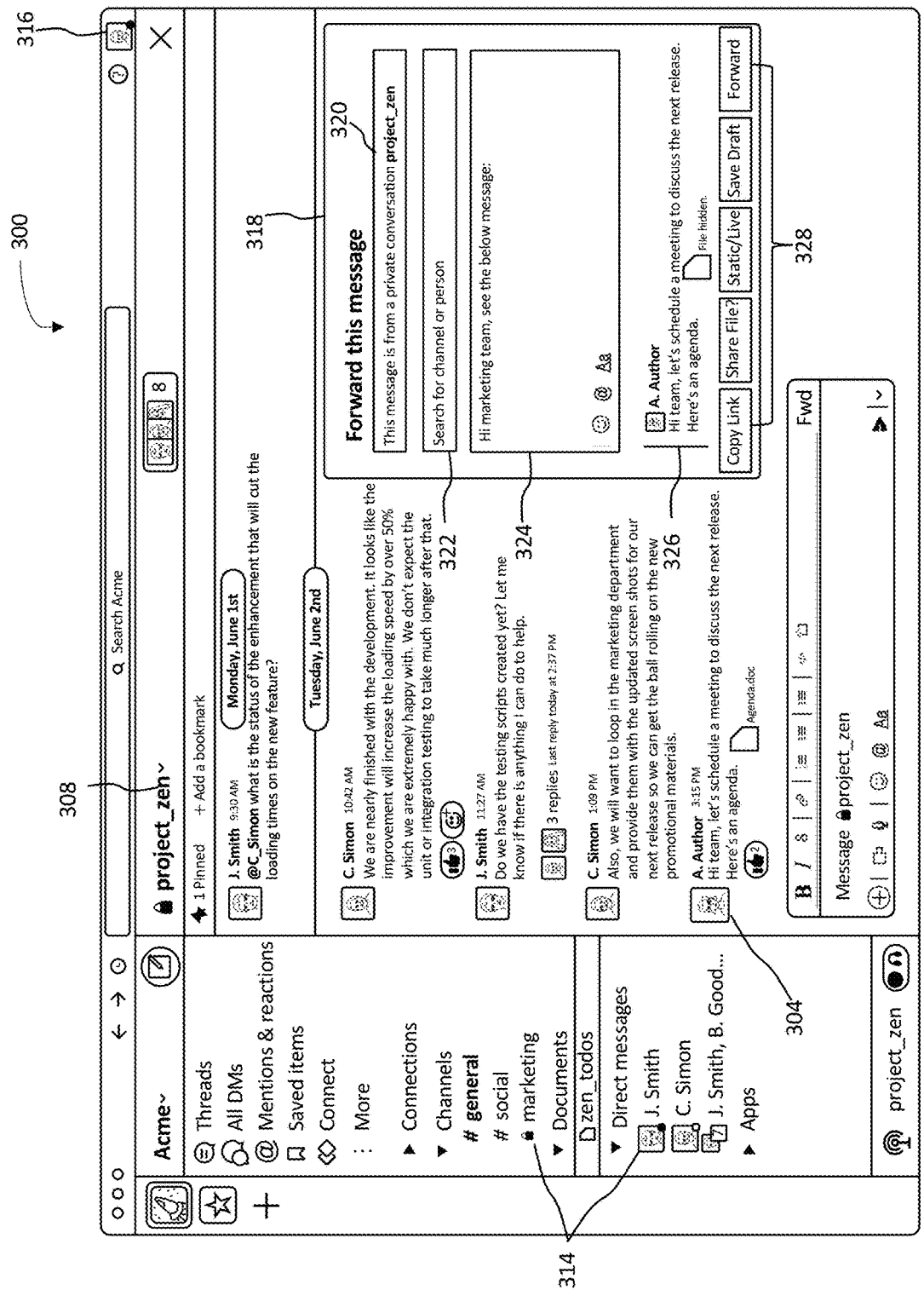
FIG. 3B illustrates a user interface for the group-based communication system for forwarding a message for certain aspects.

FIG. 3B illustrates user interface 300 displaying message 304 transmitted by authoring user 302 and depicts how message 304 may be forwarded from an origin channel 308 to one or more instances of destination channel(s) 314 by a forwarding user 316. As shown, when forwarding user 316 elects to forward a message 304, a forward message pane 318 may be displayed. In some aspects, forward message pane 318 is displayed responsive to forwarding user 316 inputting an instruction to forward the message 304. For example, the instruction may be a right click of message 304 and a selection of a forward option from a context menu (not shown) that is displayed responsive to the right click. In some aspects, the forward control in compose pane 306 may be selected as an instruction to forward the message 304. Various other methods for inputting an instruction to forward the message 304 will be readily apparent to one of skill in the art.

In some aspects, forwarding user 316 can forward multiple messages together. When forwarding multiple messages together, each message may have the same forwarding parameters applied (e.g., destination channels) as discussed further below. As previously mentioned, users may reply to a message 304 to create a message thread and, in some aspects, message threads may be forwarded. In some aspects, when a root message of a thread is forwarded, the forwarding user 316 can elect to forward all child messages of the root message are also forwarded. In some aspects, only the root message is forwarded. After selecting the desired instances(s) of message 304 to forward, forward message pane 318 may be displayed in user interface 300. Via forward message pane 318, forwarding user 316 may configure various parameters for forwarding message 304.

In some aspects, forward message pane 318 comprises a context bar 320, a search bar 322, a compose pane 324, a message preview 326, and one or more instances of affordance 328. Context bar 320 may display information associated with forwarding the message 304. For example, as shown, context bar 320 indicates that the message 304 originates from a private conversation. Information in context bar 320 may be one form of a speed bump provided to a forwarding user 316 to reduce the likelihood of message 304 being erroneously forwarded. As another example, context bar 320 may indicate that the origin channel 308 for message 304 is a private channel, thus alerting the forwarding user 316 that the message 304 may have forwarding restrictions placed thereon and/or may contain sensitive information. User-level control(s) 312a, message-level control(s) 312b, channel-level control(s) 312c, and/or workspace-level control(s) 312d associated with message 304 may also be communicated via context bar 320. For example, context bar 320 may indicate that authoring user 302 has set user-level control(s) 312a that requires the author's permission to forward the message 304.

Forwarding user 316 may search for and select channels and/or members to which to forward the message 304 via search bar 322. Search bar 322 may be substantially similar to search bar 220 discussed above. In some aspects, forwarding user 316 can select a plurality of channels and/or members as destination channel(s) 314 via search bar 322. For example, forwarding user 316 may select both the marketing channel and the direct message with J. Smith as destination channel(s) 314 for the message 304 using search bar 322. In some aspects, destination channel(s) 314 that are queried via search bar 322 and that the message 304 is not permitted to be forwarded to are grayed out, un-selectable, or otherwise displayed to indicate that the message 304 cannot be forwarded to the queried destination channel(s) 314. In some aspects, destination channel(s) 314 to which the message 304 cannot be forwarded to are excluded from the search results and/or search query. For example, if an admin user has disallowed forwarding messages to the #general channel, the #general channel may be excluded from the search query.

Forward message pane 318 may also comprise compose pane 324 by which the forwarding user 316 can compose an accompanying message to transmit with the forwarded instance of message 304. Compose pane 324 may have all of the features and functionality of compose pane 228 described above. A message preview 326 may also be displayed in forward message pane 318. In some aspects, the message preview 326 is an exact preview of how message 304 will be displayed in destination channel(s) 314. In some aspects, message preview 326 displays a limited preview of the forwarded message. In some aspects, message preview 326 displays the accompanying message authored via compose pane 324. As discussed further below, the forwarded instance of message 304 may be displayed with message context, which may be displayed in message preview 326. For example, the message context may indicate the origin channel 308 for the message 304. Other examples of message context are discussed further below.

Forward message pane 318 may also comprise one or more controls or affordances 328 that are selectable for configuring various aspects of forwarding the message 30. In some aspects, affordances 328 comprises a copy link affordance. In some aspects, instances of message 304 can be shared as links, and actuation of the copy link control copies a link to the message 304 for the user. The forwarding user 316 may then paste this link as a new message in the destination channel to share the message 304. In some aspects, a link to the message 304 is retrievable via a right click on the message 304 and selection of a copy link option in a resulting context menu. Thus, in some aspects, users can forward messages without using forward message pane 318.

In some aspects, affordances 328 comprises a share file affordance. As discussed above, users may have control over file sharing when forwarding message 304 containing files. In some aspects, the share file affordance allows forwarding user 316 to indicate whether or not the attached file is shared with the recipients. If the file is not shared, the forwarded message may comprise an indication that message 304 originally contained an attachment and/or the forwarded message may comprise a link to request access to the file (See FIGS. 3D and 3E). In some aspects, the share file affordance allows forwarding user 316 to grant access to the file to all recipients of the forwarded message.

In some aspects, affordances 328 comprises a static/live message affordance. The static/live message affordance may allow forwarding user 316 to choose whether to forward the message 304 as a static object or a live object. When a message 304 is forwarded as a static object, any changes made to the original version of message 304 after the message 304 is forwarded may not be reflected in the destination channel(s) 314 that the message was forwarded to. Thus, if the authoring user 302 makes an edit to the message 304, a user replies to the message 304, the message 304 is deleted, reactjis are applied to the message 304, or any other event associated with the message 304 occurs in the origin channel 308, said event will not be reflected in the forwarded message. By contrast, if the message 304 is sent as a live object, events associated with the message 304 that occur after the message 304 may be reflected in the forwarded version of message 304.

In some aspects, affordances 328 comprises a save draft affordance that may be selected to save a draft of the forwarded version of message 304. Drafts may be accessed in navigation pane 206 as discussed above. In some aspects, affordances 328 comprises a forward affordance that causes the message 304 to be forwarded to the one or more destination channel(s) 314. In some aspects, upon actuation of the forward affordance, the message 304 is assigned a restriction level to determine whether message 304 can be forwarded and/or any speed bumps to enact prior to forwarding the message 304. In some aspects, message 304 is evaluated responsive to receiving the instruction to forward the message 304. For example, as discussed above, the message 304 may be evaluated to determine any destination channel(s) 314 that the message 304 cannot be forwarded to such that these destination channel(s) 314 are excluded from the search query inputted into search bar 322.

Figure 3C:
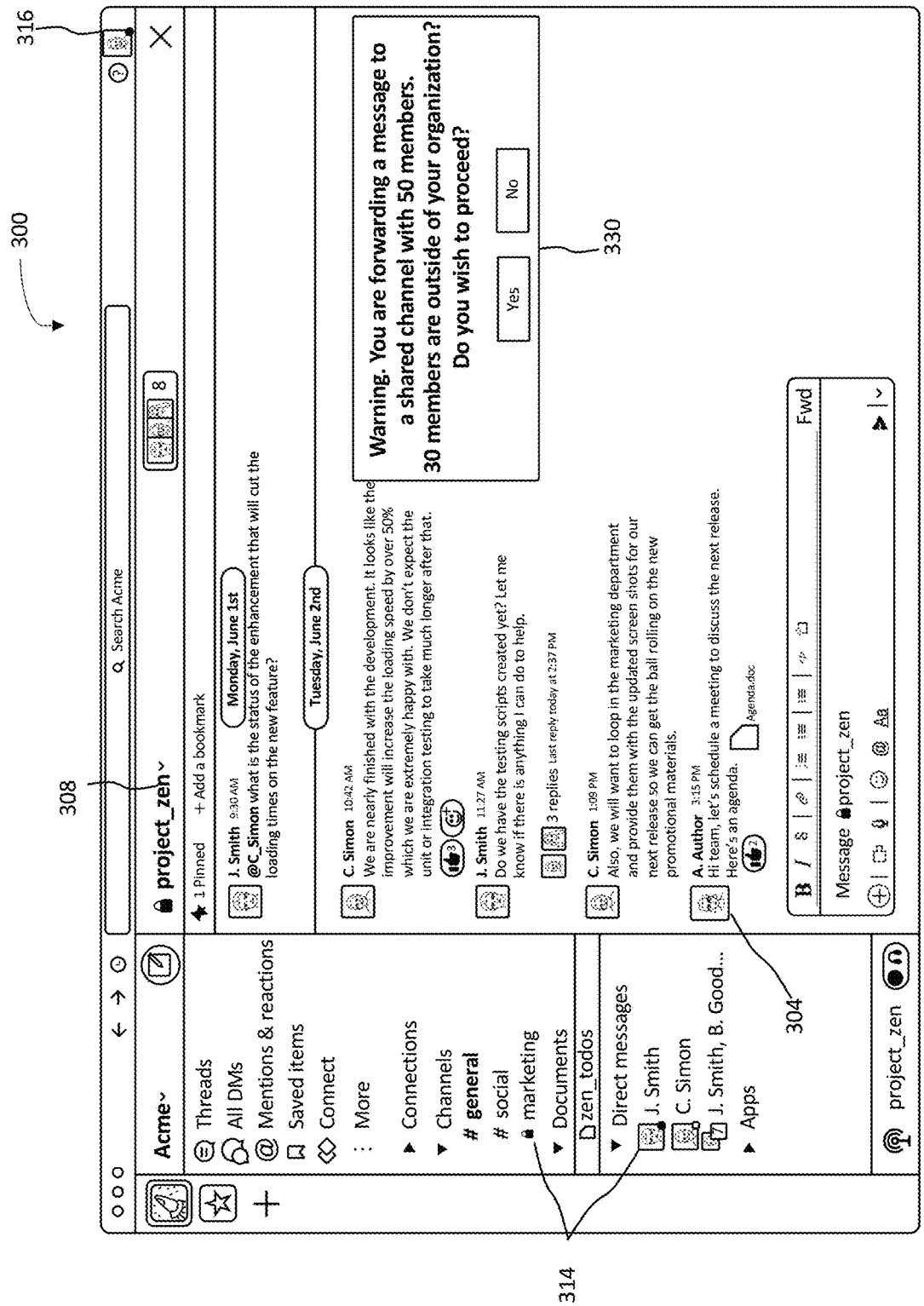
FIG. 3C illustrates a user interface for the group-based communication system depicting a confirmation prompt for forwarding the message for certain aspects.

Looking now at FIG. 3C, user interface 300 is illustrated depicting an example of confirmation prompt 330 that may be displayed before the message 304 is forwarded. Confirmation prompt 330 is one form of a speed bump that may be enacted when forwarding messages. Confirmation prompt 330 may be displayed after the forwarding user 316 inputs the instruction to forward the message 304 and before configuring the above-described parameters for forwarding the message 304 via forward message pane 318, or confirmation prompt 330 may be done after the forwarding parameters are configured and the forwarding user 316 selects the forward control affordances, or at any other point in time. In some aspects, if forwarding user 316 forwards a message 304 via sharing a link to the message 304, a confirmation prompt 330 is generated once the link is posted in the destination channel(s) 314, as shown in FIG. 3D.

The form of confirmation prompt 330 may vary based on contextual information. As shown, confirmation prompt 330 indicates that the message 304 is being forwarded to a large channel, which has members who are external to the organization of forwarding user 316. As another example, if message 304 is being forwarded to a public channel, the confirmation prompt 330 may indicate that message 304 is being shared to a public channel that anyone in the workspace can access. Confirmation prompt 330 may take many variations based on the context (e.g., destination channel(s) 314, member commonality, whether each of the destination channel(s) 314 is a shared channel, etc.) that are within the scope hereof. In some aspects, the content of confirmation prompt 330 is configurable by an admin user, authoring user 302, or any other user of the group-based communication system.

Figure 3D:
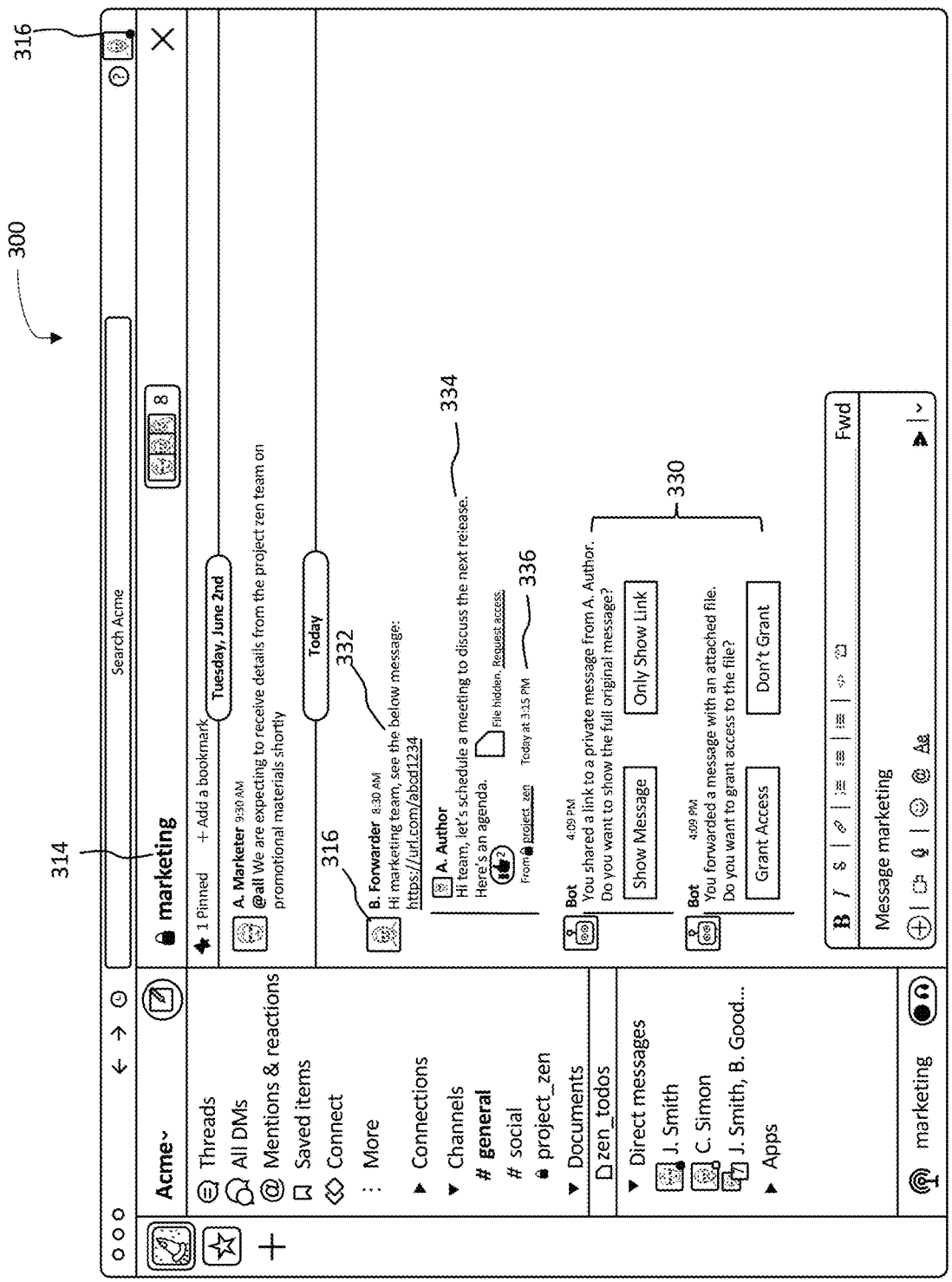
FIG. 3D illustrates a user interface for the group-based communication system depicting a forwarded message for certain aspects.

FIG. 3D illustrates user interface 300 depicting one instance of destination channel(s) 314 (here, a marketing channel) displaying a forwarded message 332 for some aspects. As shown, the forwarding user 316 has forwarded a version of message 304 by sending a link to the message 304. As discussed above, when links to instances of message 304 are shared, a confirmation prompt 330 may be automatically generated for the forwarding user 316 asking the forwarding user 316 whether to show the message or only show the link. If the forwarding user 316 elects to show the message contents to the recipients, the message 304 may be displayed as an unfurl 334, as shown. If the forwarding user 316 does not elect to show the message 304, only the link may be displayed, and the recipients may be required to click on the link to view the message 304 in the origin channel 308. In some aspects, when instances of message 304 are forwarded without a link (e.g., using forward message pane 318), only unfurl 334 may be displayed in the destination channel(s) 314. A second instance of confirmation prompt 330 is also displayed, asking the forwarding user 316 whether to share the agenda.doc file attached to the message 304. As discussed above, the forwarding user 316 may also configure how attachments are shared via forward message pane 318. As shown, forwarding user 316 has denied access to the file, and the unfurl 334 indicates that the file is hidden. In some aspects, a link to request access to the file may be provided if access is denied. If the forwarding user 316 grants access to the file, the file may be displayed and accessible in the unfurl 334.

Forwarded message 332 may also comprise message context 336. The message context 336 may provide contextual information for the forwarded message 332. For example, message context 336 may indicate the origin channel 308 of forwarded message 332. If the origin channel 308 is a private channel (e.g., a DM), the channel name may not be displayed and instead an indication that the origin channel 308 is a private channel may be provided. In some aspects, when origin channel 308 is a public channel, message context 336 may include a link to origin channel 308 that may be actuated by a user to view the channel. Selecting this link may take the user directly to the forwarded message 332 in the channel. A link to origin channel 308 may also be displayed when all recipients of the forwarded message 332 are members of the origin channel.

In some aspects, message context 336 comprises a timestamp indicating when the forwarded message 332 was authored or last edited. In some aspects, message context 336 comprises an indication of a thread associated with the forwarded message 332. In some aspects, message context 336 displays reactjis for the forwarded message 332. As discussed above, messages may be forwarded as live objects such that the message context 336 may reflect changes made to message 304. For example, any reactjis applied to message 304 after message 304 has been forwarded may be reflected in real time in message context 336.

Figure 3E:
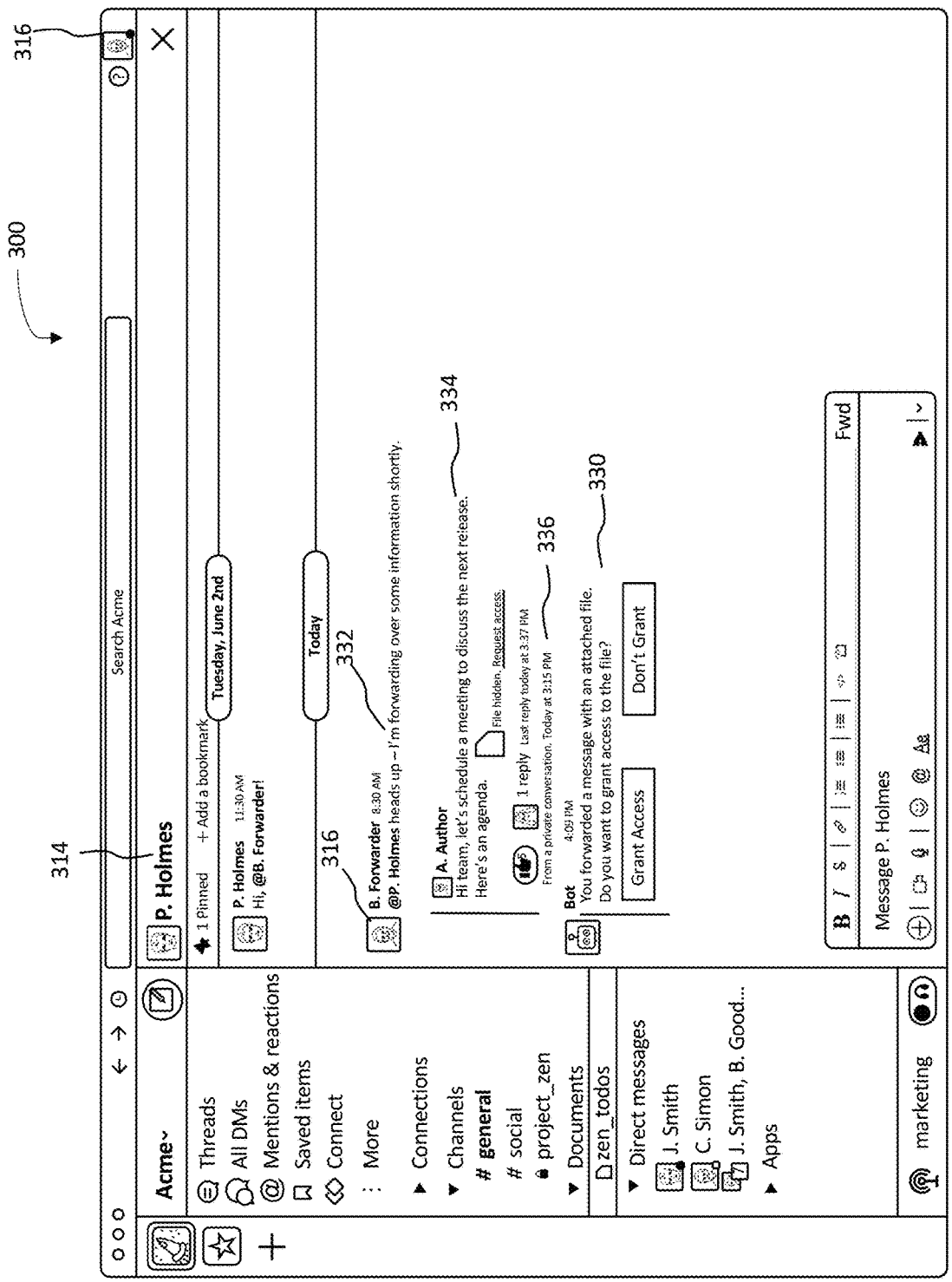
FIG. 3E illustrates a user interface for the group-based communication system depicting the forwarded message for certain aspects.

FIG. 3E illustrates user interface 300 depicting a direct message with the forwarding user 316 and a user P. Holmes. As shown, the forwarding user 316 has sent forwarded message 332 as a live object, and a thread reply and new reactjis applied to the message 304 have been reflected. However, because P. Holmes does not have access to the private channel project_zen from which forwarded message 332 originated, some contextual information is not shown. For example, the origin channel 308 is not indicated in 338. Rather, an indication or descriptor of the origin channel 308 may be provided. In some aspects, the descriptor indicates that the origin channel 308 is private or otherwise inaccessibly the user. In some aspects, a link to the inaccessible channel is provided whereby the user can request access to the channel. Other information, such as reactjis, thread replies, and the like, may also be hidden when sharing message 304 from an origin channel 308 that is a private channel that a recipient in the destination channel(s) 314 does not have access to.

Figure 4:
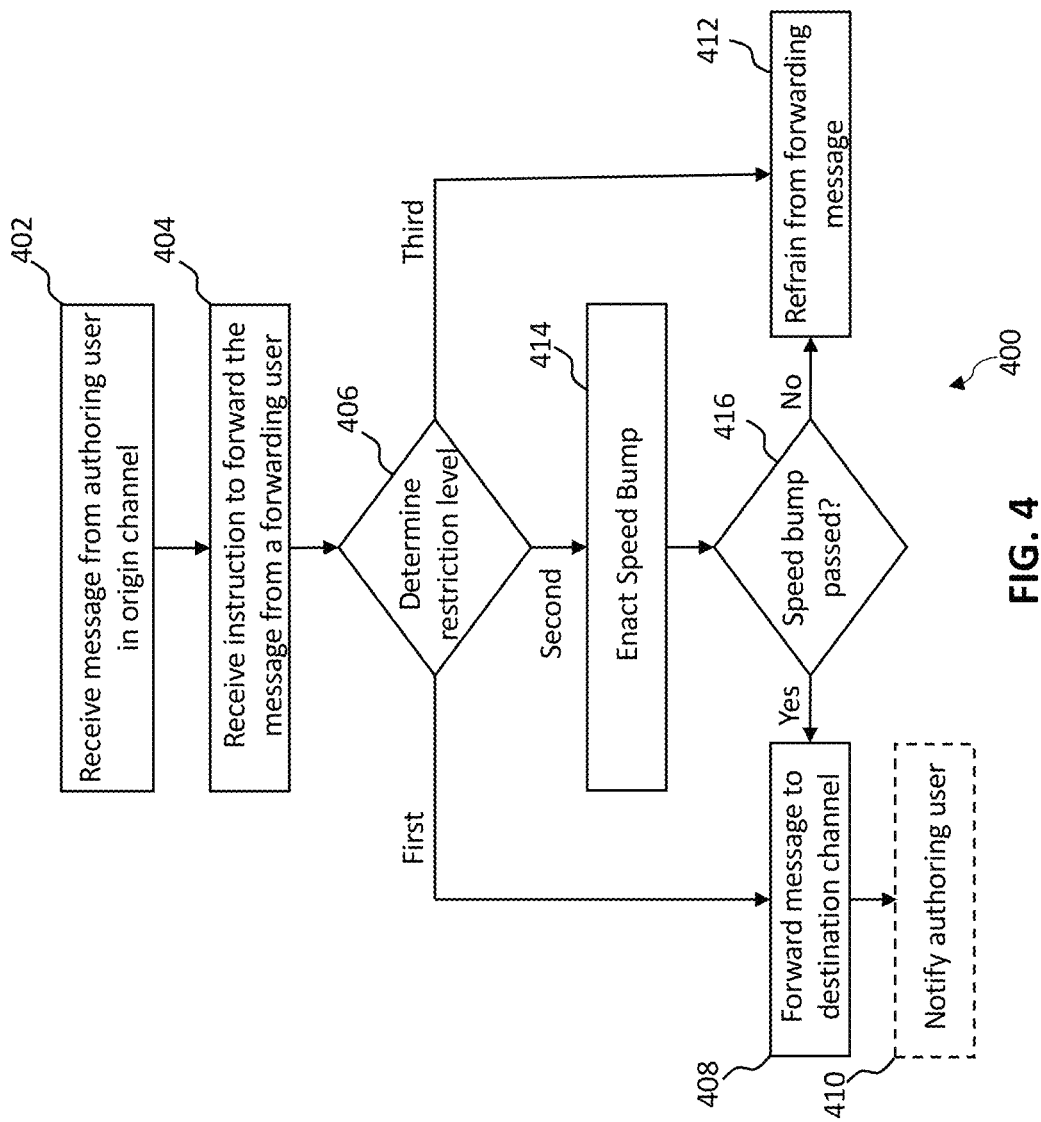
FIG. 4 illustrates a first exemplary method for certain aspects.

FIG. 4 illustrates a method 400 for contextual message forwarding for some aspects of the present disclosure. Processing may begin at step 402 where a message 304 is received in an origin channel 308. The message 304 may be transmitted by an authoring user 302. Once received, the message 304 may be displayed in the origin channel 308. As previously discussed, message 304 may be associated with one or more controls that define how message 304 can be forwarded within the group-based communication system. The controls may be one or more of user-level control(s) 312a, a message-level control(s) 312b, a channel-level control(s) 312c, or a workspace-level control(s) 312d. Additional factors that may determine whether the restriction level for the message 304 include the identity of authoring user 302 and forwarding user 316, commonality between members of origin channel 308 and destination channel(s) 314, and the type of channel or virtual space that the message 304 is being forwarded to.

Next, at step 404, an instruction to forward the message 304 may be received. The instruction may be input in the origin channel 308. For example, a forwarding user 316 may right click on the message 304 and select a forward option from a resulting contextual menu to display forward message pane 318 to forward message 304. Other methods of inputting the instruction are within the scope of aspects hereof. When inputting the instruction, the user may select one or more destination channel(s) 314 to forward the message 304 to. In some aspects, the forwarding user 316 may also select multiple instances of message 304 and/or a message thread to forward together. Instances of message 304 may be sent as static point-in-time objects or as live objects such that future edits to the original message are reflected in the forwarded message.

Thereafter, at test 406, a restriction level for the message 304 may be determined. The restriction level may determine if and/or how the message 304 can be forwarded. In some aspects, instances of message 304 have one of a first restriction level, a second restriction level, or a third restriction level as discussed above. It will be appreciated that the present disclosure is not limited to the three restriction levels described herein, and that various modifications to contextual restrictions on forwarding of message 304 will be readily apparent to one of skill in the art. The restriction level may be determined based on user-level control(s) 312a, message-level control(s) 312b, channel-level control(s) 312c, workspace-level control(s) 312d, destination channel(s) 314, the identities of authoring user 302 and/or destination channel(s) 314, and member commonality between origin channel 308 and destination channel(s) 314. Determining the restriction level based on the destination channel(s) 314, the authoring user 302 and destination channel(s) 314, and member commonality between origin channel 308 and destination channel(s) 314 is discussed further below with respect to FIG. 5. In some aspects, if message 304 is forwarded with multiple destination channel(s) 314, the restriction level is evaluated for each destination channel(s) 314.

If, at test 406, it is determined that the message 304 has the first restriction level, processing may proceed to step 408 where the message 304 is forwarded to the one or more destination channels. Thus, in some aspects, the first restriction level places no restrictions on the message 304. A message 304 may be determined to have the first restriction level when the forwarding user 316 is the authoring user 302. In some aspects, the message 304 is determined to have the first restriction level when there are no instances of user-level control(s) 312a, message-level control(s) 312b, channel-level control(s) 312c, and/or workspace-level control(s) 312d setting restrictions on forwarding message 304. Processing may then proceed to optional step 410 where the authoring user 302 is notified that a message 304 that they authored has been forwarded. The notification may include various information, such as to which destination channel(s) 314 the message 304 was forwarded and/or the identity of the forwarding user 316. In some aspects, the notification is presented in navigation pane 206, or anywhere else in the user interface.

If, at test 406, it is determined that the message 304 has the third restriction level, processing may proceed to step 412 where the system refrains from forwarding the message 304. Thus, in some aspects, the third restriction level is assigned to instances of message 304 that cannot be forwarded to the destination channel(s) 314. For example, if forwarding user 316 attempts to forward a message 304 that the authoring user 302 has set user-level control(s) 312a preventing any forwarding of the message 304, the third restriction level may be determined for the message 304, and the message 304 may be prevented from being forwarded.

If, at test 406, it is determined that the message 304 has the second restriction level, processing may proceed to step 414 where a speed bump is presented. As discussed previously, the speed bump may take various forms. In some aspects, the speed bump comprises a confirmation prompt 330 that the forwarding user 316 is required to interact with before the message 304 is forwarded as shown in FIGS. 3C and 3D. Processing may then proceed to decision 416, where it is determined if the speed bump has been passed. If yes, processing may proceed to step 408, and message 304 may be forwarded to the destination channel(s) 314. If no, processing may proceed to step 412, and the system refrains from forwarding the message 304. For example, if the confirmation prompt 330 requires the user to hit a yes or no affordance on the user interface 300, and the user selects no, the confirmation prompt may be considered failed, and the message 304 is refrained from being forwarded.

Figure 5:
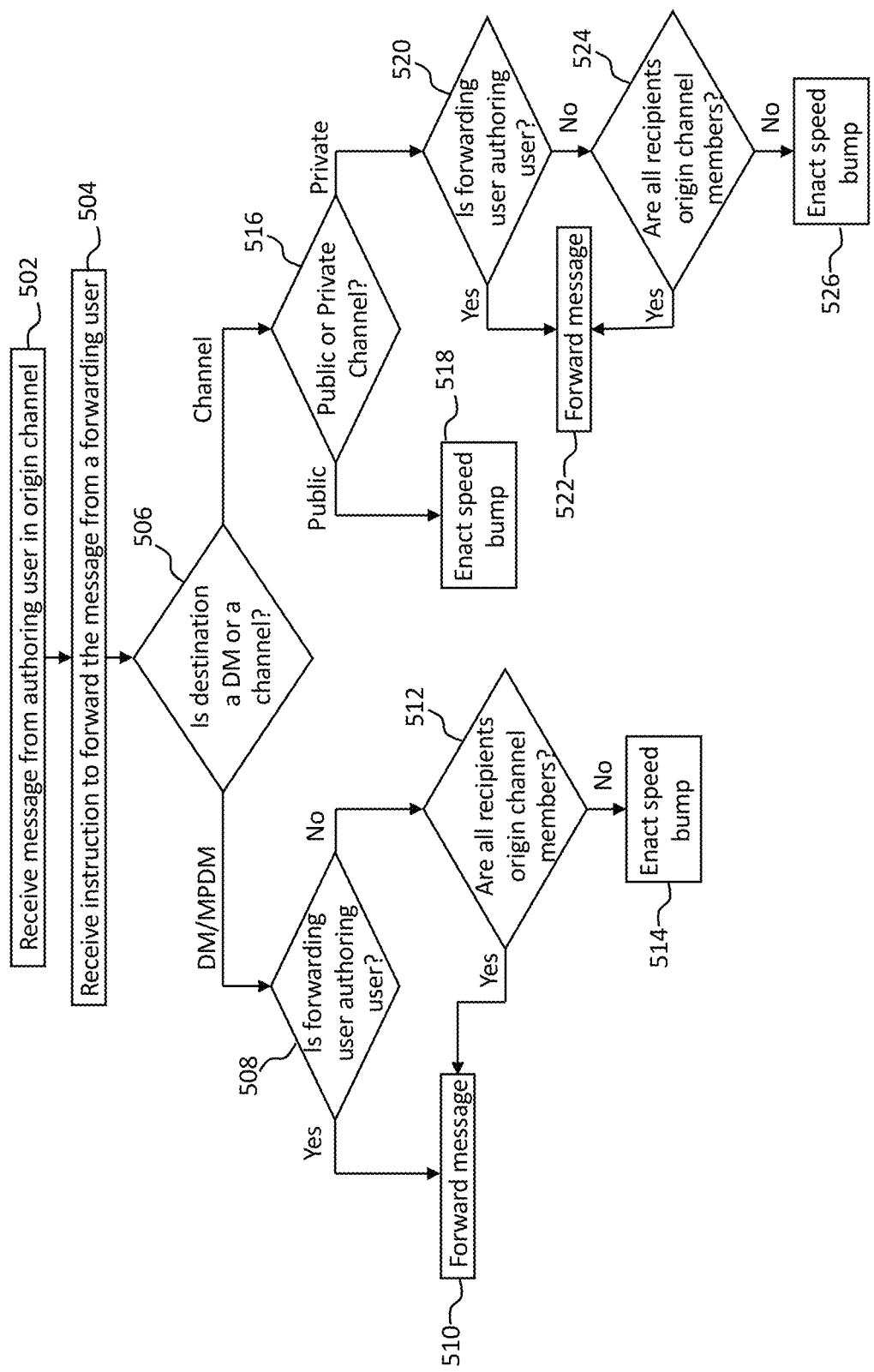
FIG. 5 illustrates a second exemplary method for certain aspects.

FIG. 5 illustrates one example of a method 500 in accordance with aspects of the present disclosure. Method 500 illustrates determination of when to generate speed bumps (i.e., second restriction level) and when to forward messages without speed bumps (i.e., first restriction level) based on channel types, the forwarding user, and channel membership when no instances of user-level control(s) 312a, message-level control(s) 312b, channel-level control(s) 312c, and/or workspace-level control(s) 312d are set on forwarding of the message 304 for some aspects of the present disclosure. Method 500 may begin with step 502 where a message 304 is received from an authoring user 302 in an origin channel 308. Step 502 may be substantially similar to step 402 described above. Next, at step 504, an instruction to forward the message 304 may be received from a forwarding user 316. Step 504 may be substantially similar to step 404 described above.

At test 506, it may be determined whether each instance of destination channel(s) 314 is a DM (i.e., a one-to-one DM or a MPDM) or a channel. If the instance of destination channel(s) 314 is a DM, processing may proceed to test 508, where it is determined whether the forwarding user 316 is the authoring user 302. If the forwarding user 316 is the authoring user, processing may proceed to step 510, and the message 304 is forwarded to the destination channel(s) 314. If, at test 508, it is determined that the forwarding user 316 is not the authoring user 302, processing may proceed to decision 512, where it is determined if all recipients of the forwarded message 332 (i.e., channel members in the destination channel(s) 314) are also members of the origin channel 308. If all the recipients are members of the origin channel 308, processing may proceed to step 510, and the message 304 may be forwarded to the destination channel(s) 314. If all the recipients are not members of the origin channel 308, processing may proceed to step 514, and the speed bump for forwarding the message 304 may be enacted.

Returning to test 506, if it is determined that the instance of destination channel(s) 314 is a channel, processing may proceed to test 516, and it may be determined whether the channel is a private channel or a public channel. As discussed above, in some aspects, a public channel is a channel that any member of the workspace can freely access, while a private channel may require an admin user to add workspace members to the private channel. If it is determined that the instance of destination channel(s) 314 is a public channel, processing may proceed to step 518, and the speed bump may be enacted. Thus, in some aspects, the speed bump is enacted regardless of whether the forwarding user 316 is the authoring user 302. If it is determined that the instance of destination channel(s) 314 is a private channel, processing may proceed to test 520, where it may be determined whether the forwarding user 316 is the authoring user 302. If the forwarding user 316 is the authoring user 302, processing may proceed to step 522, and the message 304 may be forwarded to the destination channel(s) 314. If, at test 520, it is determined that the forwarding user 316 is not the authoring user 302, processing may proceed to decision 524, where it may be determined whether all recipients of the forwarded message 332 are members of the origin channel 308. If all recipients are members of the origin channel 308, processing may proceed to step 522, and the message 304 may be forwarded to the destination channel(s) 314. If all recipients are not members of the origin channel 308, processing may proceed to step 526, and the speed bump may be enacted.

In some aspects, the speed bumps enacted vary based on the context of the message 304 being forwarded. For example, if the message 304 is being shared to a public channel, the speed bump may be a confirmation prompt displaying a message that the message 304 is about to be shared to a large number of users as shown in FIG. 3C. As another example, if the message 304 is being shared to a shared channel, the speed bump may be a confirmation prompt 330 that the message 304 is being forwarded to members outside of the user's organization.

It will be appreciated that many variations to method 500 described above are within the scope hereof. For example, in some aspects, if the channel or DM comprises external members, a speed bump may automatically be enacted if the message originates from a channel without external members to ensure that internal communications are not erroneously shared. As another example, after determining that the channel is a public channel at test 516, an additional test may determine whether the number of members in the channel is greater than a threshold (e.g., 10, 50, 100, etc.), and, if the number of members is greater than the threshold, the speed bump may be enacted. Otherwise, the message may be forwarded without a speed bump.

Having thus described various aspects of the present disclosure, what is claimed as new and desired to be protected by Letters Patent includes the following:

1. One or more non-transitory computer-readable media storing computer-executable instructions configurable to cause at least one processor to perform a method for contextual message forwarding in a group-based communication system that includes a plurality of users, the method comprising: receiving, from an authoring user, a message in a first channel of the group-based communication system, wherein the first channel is a first virtual space and the authoring user is included in a first set of the plurality of users that is authorized to access the first channel; causing display of the message in the first channel; receiving, from a second user distinct from the authoring user, an instruction to forward the message from the first channel to a second channel of the group-based communication system, wherein the second channel is a second virtual space and the second user is included in a second set of the plurality of users, different than the first set of the plurality of users, that is authorized to access the second channel; responsive to receiving the instruction, determining a restriction level for the message based on a message parameter associated with the message; responsive to determining that the restriction level is a first restriction level, presenting, to the second user, a confirmation prompt for forwarding the message; receiving, via the confirmation prompt, an input from the second user; responsive to receiving the input from the second user, forwarding the message to the second channel such that the message is persisted within the second channel for access by the second set of the plurality of users; and causing display of the message in the second channel.

2. The one or more non-transitory computer-readable media of claim 1, wherein the method further comprises:
responsive to determining that the restriction level is a second restriction level distinct from the first restriction level, forwarding the message to the second channel.

3. The one or more non-transitory computer-readable media of claim 2, wherein the method further comprises:
responsive to determining that the restriction level is a third restriction level distinct from the first restriction level and the second restriction level, refraining from forwarding the message to the second channel.

4. The one or more non-transitory computer-readable media of claim 1, wherein the message parameter comprises a first identifier for the first channel and a second identifier for the second channel.

5. The one or more non-transitory computer-readable media of claim 1, wherein the message parameter is determined or modified by the authoring user.

6. The one or more non-transitory computer-readable media of claim 1, wherein the method further comprises:
after forwarding the message to the second channel, receiving an edit to the message in the first channel to obtain an edited message, wherein the edit is created by the second user; and
updating the display of the message in the second channel to display the edited message.

7. The one or more non-transitory computer-readable media of claim 1, wherein causing display of the message further comprises displaying a context for the message, the context comprising a timestamp and a descriptor for the first channel.

8. The one or more non-transitory computer-readable media of claim 1, wherein the method further comprises:
after causing display of the message in the second channel, generating a notification to the authoring user indicating that the message was forwarded to the second channel.

9. The one or more non-transitory computer-readable media of claim 1, wherein forwarding the message comprises forwarding a link that links to the message in the first channel, and wherein the method further comprises:
responsive to forwarding the link to the second channel, presenting a second confirmation prompt to the second user, and
responsive to receiving a second input via the second confirmation prompt, displaying the message associated with the link.

10. A method for contextual message forwarding in a group-based communication system that includes a plurality of users, the method comprising: receiving, from an authoring user, a message in a first channel of the group-based communication system, wherein the first channel is a first virtual space and the authoring user is included in a first set of the plurality of users that is authorized to access the first channel; causing display of the message in the first channel; receiving, from a second user distinct from the authoring user, an instruction to forward the message from the first channel to a second channel of the group-based communication system, wherein the second channel is a second virtual space and the second user is included in a second set of the plurality of users, different than the first set of the plurality of users, that is authorized to access the second channel; responsive to receiving the instruction, determining a restriction level for the message based on a message parameter associated with the message; responsive to determining that the restriction level is a first restriction level, presenting, to the second user, a confirmation prompt for forwarding the message; receiving, via the confirmation prompt, an input from the second user; responsive to receiving the input from the second user, forwarding the message to the second channel such that the message is persisted within the second channel for access by the second set of the plurality of users; and causing display of the message in the second channel.

11. The method of claim 10, wherein the method further comprises:
responsive to determining that the restriction level is a second restriction level distinct from the first restriction level, forwarding the message to the second channel; and
responsive to determining that the restriction level is a third restriction level distinct from the first restriction level and the second restriction level, refraining from forwarding the message to the second channel.

12. The method of claim 10, wherein the message parameter is determined or modified by the authoring user.

13. The method of claim 10, wherein the method further comprises:
after forwarding the message to the second channel, receiving an edit to the message in the first channel to obtain an edited message, wherein the edit is created by the second user; and
updating the display of the message in the second channel to display the edited message.

14. The method of claim 10, wherein causing display of the message further comprises displaying a context for the message, the context comprising a timestamp and a descriptor for the first channel.

15. A system, comprising: at least one processor; and one or more non-transitory computer-readable media storing computer-readable instructions configurable to cause the at least one processor to perform a method for contextual message forwarding in a group-based communication system that includes a plurality of users, the method comprising: receiving, from an authoring user, a message in a first channel of the group-based communication system, wherein the first channel is a first virtual space and the authoring user is included in a first set of the plurality of users that is authorized to access the first channel; causing display of the message in the first channel; receiving, from a second user distinct from the authoring user, an instruction to forward the message from the first channel to a second channel of the group-based communication system, wherein the second channel is a second virtual space and the second user is included in a second set of the plurality of users, different than the first set of the plurality of users, that is authorized to access the second channel; responsive to receiving the instruction, determining a restriction level for the message based on a message parameter associated with the message; responsive to determining that the restriction level is a first restriction level, presenting, to the second user, a confirmation prompt for forwarding the message; receiving, via the confirmation prompt, an input from the second user; responsive to receiving the input from the second user, forwarding the message to the second channel such that the message is persisted within the second channel for access by the second set of the plurality of users; and causing display of the message in the second channel.

16. The system of claim 15, wherein the method further comprises:
responsive to determining that the restriction level is a second restriction level distinct from the first restriction level, forwarding the message to the second channel.

17. The system of claim 16, wherein the method further comprises:
responsive to determining that the restriction level is a third restriction level distinct from the first restriction level and the second restriction level, refraining from forwarding the message to the second channel.

18. The system of claim 15, wherein:
the message parameter comprises a first identifier for the first channel and a second identifier for the second channel; and
the message parameter is determined or modified by the authoring user.

19. The system of claim 15, wherein the method further comprises:
after forwarding the message to the second channel, receiving an edit to the message in the first channel to obtain an edited message, wherein the edit is created by the second user; and
updating the display of the message in the second channel to display the edited message.

20. The system of claim 15, wherein causing display of the message further comprises displaying a context for the message, the context comprising a timestamp and a descriptor for the first channel.

* * * * *